Patented Aug. 22, 1972

3,686,132
FORMULATION METHOD OF VULCANIZATION
ACCELERATORS
Seiji Sagawa, Hirataka-shi, Haruo Kunihiro, Takasuki-shi, Osamu Kimura, Toyonaka-shi, Kenichiro Numata, Nishinomiya-shi, and Masatoshi Inoue, Toyonaka-shi, Japan, assignors to Sumitomo Chemical Co., Ltd., Osaka-shi, Osaka-fu, Japan
No Drawing. Filed July 17, 1970, Ser. No. 55,940
Claims priority, application Japan, July 22, 1969, 44/58,252
Int. Cl. C09k 3/00
U.S. Cl. 252—182                                              6 Claims

ABSTRACT OF THE DISCLOSURE

A method for processing vulcanization accelerators which comprises heating a mixture of a vulcanization accelerator, for example, sulfenamides or thiurams, and a hydrocarbon to make the vulcanization accelerator oily and pouring the oily product into an aqueous medium to form small spheres of said accelerator. The resultant formulation has an excellent dispersibility into rubber materials and a good surface smoothness.

---

The present invention relates to a method for processing vulcanization accelerators which are solid at room temperature, particularly organic vulcanization accelerators which are soluble in hydrocarbons and are useful in the production of rubber.

In the rubber processing industry, there is a tendency toward the automation weighing of various additives in order to reduce the labor cost, shorten the processing time, provide a more rapid and reliable weighing, etc. On the other hand, in the case of handling pulverized vulcanization accelerators such as N-oxydiethylenebenzothiazole-2-sulfenamide, dermatitis on human beings is apt to be caused from the dusts thereof. For these reasons, it is preferred that the vulcanization accelerators be provided in flakes, rods, blocks or in any other collective form, rather than in powder form. However, in order to process vulcanization accelerators in such collective forms, the use of appropriate binding agents may be required. Such binding agents occasionally decrease the dispersibility of the vulcanization accelerators into rubber materials and make the physical properties of the vulcanized rubber products correspondingly inferior. Furthermore, collective forms of vulcanization accelerators processed as mentioned above do not have a good smoothness. Moreover, the processing of vulcanization accelerators in the above manner requires special apparatus such as granulators, whereby the production cost is necessarily increased.

One of the objects of the present invention is to provide a method for formulating vulcanization accelerators which overcomes the disadvantages and deficiencies of the prior art.

Another object of the invention is to provide a method for formulating vulcanization accelerators wherein the accelerators retain a good dispersibility and have a good smoothness.

A further object of the invention is to provide vulcanization accelerator formulations.

These and other objects and advantages of the present invention will become apparent to those skilled in the art from a consideration of the following specification and claims.

It has now been unexpectedly found that the simple treatment of vulcanization accelerators in solid form at room temperature with water and a hydrocarbon affords small spheres which are excellent in dispersibility into rubber materials and are much improved with respect to the smoothness on their surface. Accordingly, pursuant to the present invention, the organic vulcanization accelerator is treated with water and a hydrocarbon to form small spheres of the accelerator. More concretely, the present invention provides a method for processing vulcanization accelerators which comprises heating a mixture of a vulcanization accelerator and a hydrocarbon to make it oily and pouring the oily product into an aqueous medium to form small spheres of said accelerator.

Examples of the vulcanization accelerator which may be processed according to the present invention are sulfenamides such as those represented by the following formula:

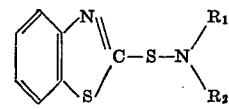

wherein $R_1$ is hydrogen or alkyl having 1 to 4 carbon atoms and $R_2$ is alkyl having 1 to 4 carbon atoms, or $R_1$ and $R_2$ are bonded to each other to form an oxydialkylene group having 4 carbon atoms or an alkylene group having 4 or 5 carbon atoms, and thiurams such as those represented by the following formula:

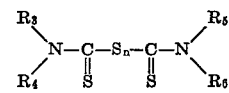

wherein $R_3$, $R_4$, $R_5$ and $R_6$ are each alkyl having 1 to 4 carbon atoms and $n$ is the integer 1 or 2.

Hydrocarbons utilizable in the present invention are preferably liquid at room temperature, having a boiling point higher than 30° C. Specific examples thereof are benzene, toluene, xylene, ethylbenzene, isopropylbenzene, isopropyltoluene, diisopropylbenzene, diisopropyltoluene, mesitylene, ligroin, hexane, heptane, octane, pentane, decane, dodecane, etc. The hydrocarbon is usually employed in an amount of about 5 to 50% by weight, preferably 15 to 30% by weight, based on the amount of the accelerator.

In carrying out the present invention, the accelerator is mixed with the hydrocarbon, the resultant mixture is heated in order to make it oily up to a temperature of 5° to 20° C., favorably 10° to 15° C., higher than the temperature at which the accelerator begins to crystallize out on cooling (usually up to 50° to 100° C.), and the resultant oily product is poured dropwise onto a surface of water. The precipitated spheres of accelerator are collected and dried.

The process of the present invention is not only applicable to the vulcanization accelerator in undesirable forms such as a powder, but is also applicable to a reaction mixture containing the vulcanization accelerator. For instance, after completion of the reaction of 2-mercaptobenzothiazole and an amine represented by the formula:

wherein $R_1$ and $R_2$ are each as defined above, or after completion of the reaction of carbon sulfide and at least one dialkylamine represented by the formula:

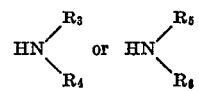

wherein $R_3$, $R_4$, $R_5$ and $R_6$ are each as defined above, in the presence of an alkali hydroxide, the hydrocarbon is admixed therewith while heating, and the resultant mixture is separated into a water layer and a hydrocarbon layer. The hydrocarbon layer, i.e., the oil layer, which contains the accelerator is poured dropwise onto or under the surface of water. The precipitated spheres of the accelerator are collected and dried.

The temperature of water into which the hydrocarbon layer is added is about 5° to 30° C., preferably from 15° to 20° C. For obtaining better results in increasing the smoothness of the spherical surface and making the spherical size uniform, the previous incorporation of 1 to 5% by weight of a surface active agent, such as alkyl benzene sulfonates, into the water is preferred. In the case that the control of the retention time of the oil drops in water is required, an aqueous sodium chloride solution may be employed in place of the water. The water or aqueous sodium chloride solution may be used with repetition.

As stated above, the small spheres of vulcanization accelerator obtained by the present invention not only disperse well in rubber materials and are more fluently handled on rubber processing equipment than the case where an accelerator in powdery form is used, but also can be handled without any dusting, as often happens in the latter case. It is advantageous that the size of the spheres can be arbitrarily controlled by appropriately setting the diameter of an outlet of the vessel out of which the hydrocarbon solution containing the accelerator is dropped and by adjusting the pressure of the dropping into water. It is also advantageous that the hardness of the spheres can be suitably regulated by using an appropriate amount of a hydrocarbon, based on the amount of accelerator, and by controlling the temperature of the aqueous medium.

Practical and presently preferred embodiments of the present invention are illustratively shown in the following examples, which are, of course, not intended to limit the scope of the present invention.

EXAMPLE 1

To 450 g. of aqueous slurry which contains 100 g. of N-cyclohexylbenzothiazole-2-sulfenamide [obtained by adding an aqueous solution of sodium hypochlorite to a mixture of an aqueous solution of 2-mercaprobenzothiazole sodium salt, cyclohexylamine and sulfuric acid for oxidation], 20 g. of benzene are added, and the resultant mixture is heated up to 90° C., whereby a water layer containing inorganic salts and an oil layer are separated. The oil layer is charged in a dropping funnel and dropped onto the surface of a 20% aqueous solution of sodium chloride containing 1% of sodium dodecylbenzenesulfonate in a column having a height of 1 meter and a diameter of 10 cm. The oil drops solidify in the water and precipitate at the bottom. The precipitates are collected and dried with air to give 10 g. of small, porous spheres of N-cyclohexylbenzothiazole-2-sulfenamide.

EXAMPLE 2

To 300 g. of aqueous slurry which contains 55 g. of N-t-butylbenzothoazole-2-sulfenamide [obtained by adding an aqueous solution of sodium hypyochlorite to a mixture of an aqueous solution of 2-mercaptobenzothiazole sodium salt, t-butylamine and sulfuric acid for oxidation], 16 g. of toluene are added, and the resultant mixture is heated up to 80° C. The separated oil layer is treated as in Example 1 to give 55 g. of small, porous spheres of N-t-butylbenzothiazole-2-sulfenamide.

EXAMPLE 3

To 300 g. of aqueous slurry which contains 62 g. of N-oxydiethylenebenzothiazole-2-sulfenamide [obtained by adding an aqueous solution of sodium hypochlorite to a mixture of an aqueous solution of 2-mercaptobenzothiazole sodium salt, morpholine and sulfuric acid for oxidation], 6 g. of diisopropylbenzene are added, and the resultant mixture is heated up to 70° C. The separated oil layer is treated as in Example 1 to give 62 g. of small, porous spheres of N-oxydiethylenebenzothiazole-2-sulfenamide.

EXAMPLE 4

To 500 g. of aqueous slurry which contains 80 g. of tetramethylthiuram disulfide [obtained by introducing chlorine into an aqueous solution of sodium dimethyldithiocarbamate prepared by reacting dimethylamine, sodium hydroxide and carbon disulfide while cooling], 16 g. of benzene are added, and the resultant mixture is heated up to 70° C. The separated oil layer is treated as in Example 1 to give 80 g. of small, porous spheres of tetramethylthiuram disulfide.

EXAMPLE 5

To 450 g. of aqueous slurry which contains 100 g. of N - cyclohexylbenzothiazole-2-sulfenamid [obtained by adding an aqueous solution of sodium hypochlorite to a mixture of an aqueous solution of 2-mercaptobenzothiazole sodium salt, cyclohexylamine and sulfuric acid for oxidation], 40 g. of ligroin are added, and the resultant mixture is stirred at about 70° C. for 30 minutes, whereby a water layer containing inorganic salts and an oil layer are separated. The oil layer is dropped onto the surface of water in a column having a height of 1.5 meters and a diameter of 10 cm. under pressure with nitrogen gas. The precipitates are collected to give 100 g. of small spheres of N-cyclohexylbenzothiazole-2-sulfenamide.

EXAMPLE 6

To 300 g. of aqueous slurry which contains 62 g. of N-oxydiethylenebenzothiazole-2-sulfenamide [obtained by adding an aqueous solution of sodium hypochlorite to a mixture of an aqueous solution of 2-mercaptobenzothiazole sodium salt, morpholine and sulfuric acid for oxidation], 12 g. of n-pentane are added, and the resultant mixture is stirred at about 70° C. for 30 minutes. The separated oil layer is treated as in Example 5 to give 62 g. of small spheres of N-oxydiethylenebenzothiazole-2-sulfenamide.

EXAMPLE 7

To 300 g. of aqueous slurry which contains 55 g. of N-t-butylbenzothiazole-2-sulfenamide [obtained by adding an aqueous solution of sodium hypochlorite to a mixture of an aqueous solution of 2-mercaptobenzothiazole sodium salt, t-butylamine and sulfuric acid for oxidation], 17 g. of dodecane are added, and the resultant mixture is stirred at about 80° C. for 30 minutes. The separated oil layer is treated as in Example 5 to give 55 g. of small spheres of N-t-butylbenzothiazole-2-sulfenamide.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A method for processing vulcanization accelerators which comprises heating a mixture of a vulcanization accelerator selected from the group consisting of a sulfenamide of the formula:

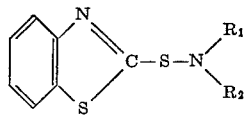

wherein $R_1$ is hydrogen or alkyl having 1 to 4 carbon atoms and $R_2$ is alkyl having 1 to 4 carbon atoms, or $R_1$ and $R_2$ are bonded to each other to form an oxydialkylene group having 4 carbon atoms or to form an alkylene group having 4 or 5 carbon atoms, and a thiuram of the formula:

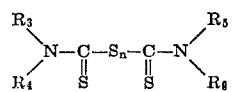

wherein $R_3$, $R_4$, $R_5$ and $R_6$ are each alkyl having 1 to 4 carbon atoms and $n$ is 1 or 2, and a hydrocarbon to make the mixture oily and pouring the resultant oily product dropwise into an aqueous medium selected from the group consisting of water and an aqueous sodium chloride solution to form small spheres of said accelerator, said hydrocarbon being liquid at room temperature and having a boiling point higher than 30° C. and being used in an amount of from about 5 to 50 percent by weight based on the amount of said accelerator.

2. A method according to claim 1, wherein the hydrocarbon is selected from the group consisting of benzene, toluene, xylene, ethylbenzene, isopropylbenzene, isopropyltoluene, diisopropylbenzene, diisopropyltoluene, mesitylene, ligroin, hexane, heptane, octane, pentane, decane and dodecane.

3. A method according to claim 1, wherein the mixture of vulcanization accelerator and hydrocarbon is heated to about 50° to 100° C.

4. A method according to claim 1, wherein the temperature of the aqueous medium into which the oily product is added is about 5° to 30° C.

5. A method according to claim 4, wherein said aqueous medium further includes about 1 to 5% of a surface active agent which is an alkyl benzenesulfonate.

6. A vulcanization accelerator produced by the method of claim 1.

References Cited
UNITED STATES PATENTS

| | | | |
|---|---|---|---|
| 2,844,564 | 7/1958 | Hayes | 260—793 X |
| 3,558,739 | 1/1971 | Kagarise | 260—793 X |
| 3,431,214 | 3/1969 | McDonald | 252—182 X |
| 3,362,913 | 1/1968 | Bale et al. | 252—182 |

MAYER WEINBLATT, Primary Examiner

U.S. Cl. X.R.

252—426; 260—785, 793